United States Patent
Lee, Jr. et al.

(10) Patent No.: US 8,869,685 B2
(45) Date of Patent: Oct. 28, 2014

(54) FOOD PREPARATION APPARATUS

(75) Inventors: Maurice W. Lee, Jr., Boley, OK (US); Betty Lee, legal representative, Boley, OK (US); Maurice W. Lee, III, Oklahoma City, OK (US)

(73) Assignee: Electra Wave Corporation, Boley, OK (US)

( * ) Notice: Subject to any disclaimer, the term of this patent is extended or adjusted under 35 U.S.C. 154(b) by 774 days.

(21) Appl. No.: 12/624,051

(22) Filed: Nov. 23, 2009

(65) Prior Publication Data
US 2011/0174164 A1    Jul. 21, 2011

(51) Int. Cl.
A23B 4/044    (2006.01)
A23B 4/052    (2006.01)
A47J 36/22    (2006.01)
F24C 15/16    (2006.01)

(52) U.S. Cl.
CPC . *F24C 15/16* (2013.01); *A47J 36/22* (2013.01)
USPC ........... 99/482; 99/448; 99/449; 99/450; 99/347

(58) Field of Classification Search
USPC ........... 99/482, 448, 449, 416, 417, 418, 415, 99/346, 347, 450, 446, 400; 219/401; 211/181.1
See application file for complete search history.

(56) References Cited

U.S. PATENT DOCUMENTS

| | | | |
|---|---|---|---|
| 282,542 A * | 8/1883 | Lockwood | 99/448 |
| 604,252 A * | 5/1898 | Lockstone | 99/446 |
| 931,533 A * | 8/1909 | Warner | 220/485 |
| 1,093,450 A | 4/1914 | McLaughlin | |
| 2,842,043 A * | 7/1958 | Renland | 99/482 |
| 3,057,671 A | 10/1962 | Forman | |
| 3,224,357 A | 12/1965 | Rubens | |
| 3,327,617 A * | 6/1967 | Harlett | 99/340 |
| 3,583,307 A * | 6/1971 | Lee, Sr. | 99/333 |
| 3,592,668 A * | 7/1971 | Denk | 99/324 |
| 4,191,160 A * | 3/1980 | Elliott | 126/9 R |
| 4,686,896 A * | 8/1987 | Gordon | 99/482 |
| 5,070,777 A * | 12/1991 | Novak | 99/482 |
| 5,320,028 A * | 6/1994 | Grunberg | 99/340 |
| 6,050,177 A * | 4/2000 | Lassig, Jr. | 99/340 |
| 6,349,717 B1 | 2/2002 | Thompson | |
| 6,841,759 B2 * | 1/2005 | Elwedini | 219/386 |
| 6,903,310 B1 | 6/2005 | Lee, Jr. et al. | |
| 6,926,001 B2 | 8/2005 | Bartley | |
| 7,347,198 B2 | 3/2008 | Freese et al. | |

FOREIGN PATENT DOCUMENTS

| | | |
|---|---|---|
| CA | 2411298 | 5/2004 |
| EP | 0109267 | 6/1988 |
| GB | 2006424 | 5/1979 |
| JP | 59189232 | 10/1984 |

* cited by examiner

*Primary Examiner* — Reginald L Alexander
(74) *Attorney, Agent, or Firm* — Daniel P. Dooley; Hall Estill Attorneys at Law

(57) ABSTRACT

A food preparation apparatus and method, including an inventive shelving system, is provided. In accordance with some embodiments, an exemplary embodiment of a food preparation apparatus of the present invention includes at least, but is not limited to, a frame assembly including a permanent shelf secured to the frame assembly, a multiplicity of selectable shelf features vertically offset from the permanent shelf and attached to the frame assembly, and a first non-permanent shelf vertically offset from the permanent shelf and supported by a select number of the multiplicity of selectable shelf features. In an exemplary embodiment of a food preparation apparatus of the present invention, the permanent shelf provides a flavor infusion region.

12 Claims, 6 Drawing Sheets

FOOD PREPARATION APPARATUS

BACKGROUND

Various shelving systems can be utilized for a number of different purposes. Some shelving systems can be utilized in a cooking environment, such as in the case of an oven rack.

As will be appreciated, a shelving system can be difficult to manipulate and configure in order to support various sized items. Many shelving systems use independent shelves that engage a feature of another appliance to facilitate movement and extraction of one, or all, shelves. Furthermore, the independent shelves are often uniform in design so that a large amount of space is unusable due to the presence of shelves or obstacles in close proximity. As a result, configurability of a shelving system is frequently in competition with available space to the detriment of the user.

In these and other types of shelving systems, it is often desirable to increase efficiency, particularly with regard to increasing possible configurations while allowing space for a variety of differently sized items.

SUMMARY

Various illustrative embodiments of the present invention are generally directed to a food preparation apparatus and method, including an inventive shelving system. An exemplary embodiment of a food preparation apparatus of the present invention includes at least, but is not limited to, a frame assembly including a permanent shelf secured to the frame assembly, a multiplicity of selectable shelf features vertically offset from the permanent shelf and attached to the frame assembly, and a first non-permanent shelf vertically offset from the permanent shelf and supported by a select number of the multiplicity of selectable shelf features. In an exemplary embodiment of a food preparation apparatus of the present invention, the permanent shelf provides a flavor infusion region.

In an alternate exemplary embodiment, a method of forming and using the food preparation apparatus of the present invention includes at least, but is not limited to, the steps of, providing a self-supporting frame assembly including a permanent shelf attached to the frame assembly [wherein the permanent shelf provides a flavor infusion region], securing a multiplicity of selectable shelf features to the frame assembly, and securing at least one non-permanent shelf to the frame assembly through engagement of the non-permanent shelf with a select number of the multiplicity of selectable shelf features.

The alternate exemplary method of forming and using embodiment of the food preparation apparatus of the present invention includes at least, but is not limited to, the steps of, depositing a flavor enhancement substance in a flavor infusion component confined within a food preparation chamber, in which the food preparation chamber and said flavor infusion component are each formed by distinct cylindrical walls interacting with distinct bases. The next exemplary steps include placing a predetermined amount of food on the non-permanent shelf secured to the frame assembly, situating the frame assembly including the supported food in the food preparation chamber so as to avoid contact with the cylindrical wall of the food preparation chamber, and to assure the flavor infusion region of the cylindrical wall of the food preparation chamber is positioned in non-contacting adjacency with a mid-region of the cylindrical wall of the flavor infusion component. When the rack supporting the food is finally positioned within the food preparation chamber, an environment of the food preparation chamber is adjusted to infuse the food with a predetermined flavor obtained from the flavor enhancement substance.

These and other features and advantages which characterize the various embodiments of the present invention can be understood in view of the following detailed discussion and the accompanying drawings.

DETAILED DESCRIPTION

Figure 1:
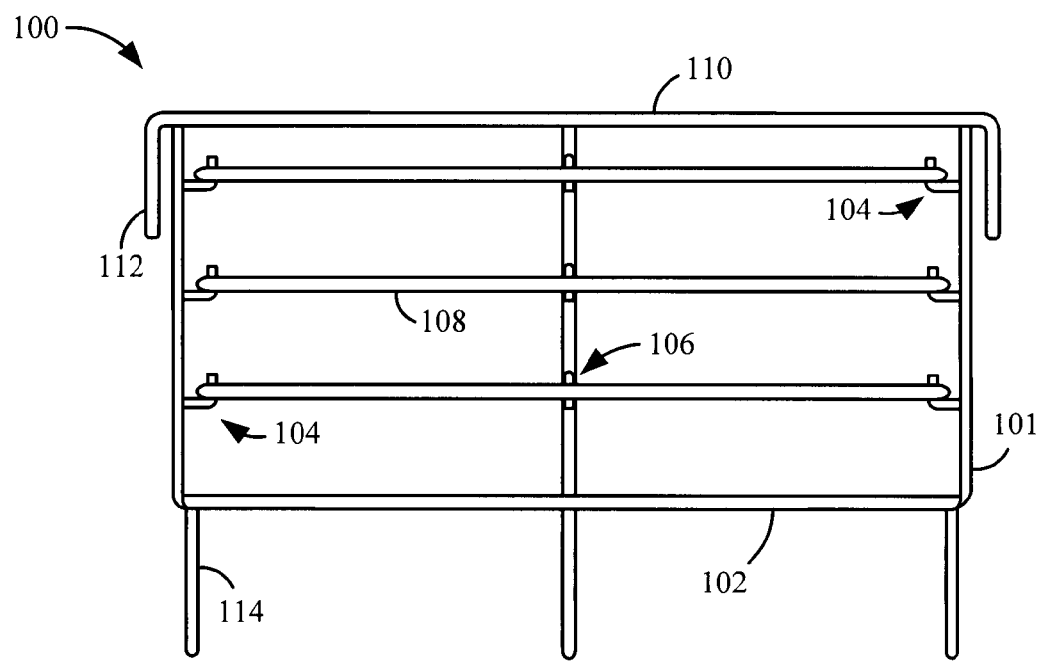
FIG. 1 is a front elevation view of an exemplary shelving system constructed and operated in accordance with various embodiments of the present invention.

Referring now to the drawings, FIG. 1 provides an elevational front view of an exemplary embodiment of a food preparation shelving apparatus 100, which combines a frame assembly 101 with a permanent shelf 102, and a number of first and second selectable shelf features 104 and 106 for preparation of food products. The selectable shelf features 104 and 106 can interact to secure one, or more, non-permanent shelve(s) 108 in a vertically offset position from the permanent shelf 102 to facilitate a range of shelving configurations for food preparation. Each shelving configuration may be facilitated by the non-permanent shelf 108 engaging a select number of the first and second selectable shelf features 104 and 106.

While not limiting, the non-permanent shelf 108 can simultaneously engage several first selectable shelf features 104 and second selectable shelf features 106. In various embodiments, the first selectable shelf feature 104 can have an upwardly facing support component that provides vertical and horizontal support to a non-permanent shelf 108. Conversely, the second selectable shelf feature 106 can be inverted with respect to the first selectable features 104 so that vertical and horizontal support is provided by a downward facing support component. In an exemplary operation, a non-permanent shelf 108 can engage and be secured by any number of first and second selectable shelf features 104 and 106 on any number of different horizontal planes.

Furthermore, any number of non-permanent shelf features 108 can be attached to and supported by the frame assembly 101. As shown, three non-permanent shelves 108 occupy all the available selectable shelf features 104 and 106 on multiple different horizontal planes. However, such non-permanent shelf configuration is not required or limiting as any number of non-permanent shelves 108 can be integrated into the frame assembly 101.

The food preparation shelving apparatus 100 can also be designed with a rail 110 that extends only partially around the circumference of the permanent shelf 102. In some embodiments, the rail 110 includes turn-down features 112 that transition the rail 110 from a substantially horizontal orientation to a substantially perpendicular orientation in relation to the permanent shelf 102. However, the presence and orientation of the rail 110 and turn-down features 112 are not required elements of the frame assembly 101. Further in some embodiments, the frame assembly 101 including the permanent shelf 102 can be elevated with respect to a reference surface by a number of legs 114. It can be appreciated that the number and orientation of the legs 114 are not limited to the configuration shown in FIGS. 1-2.

Figure 2:
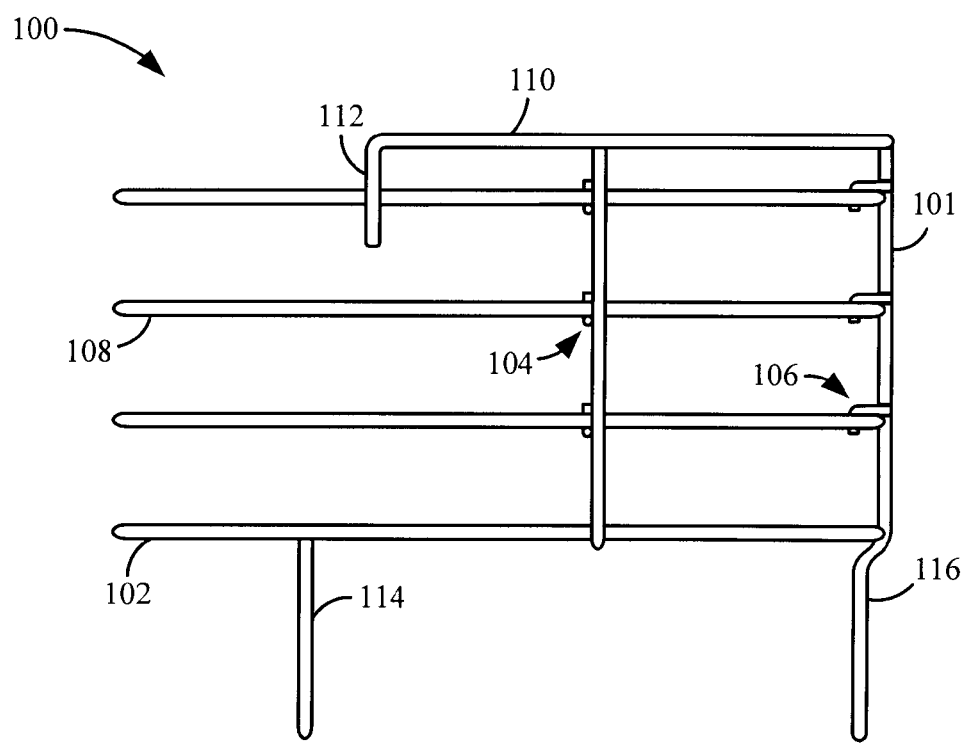
FIG. 2 displays a side elevation view of the shelving system of FIG. 1.

In an exemplary embodiment, as shown by the side elevational view of FIG. 2, the food preparation shelving apparatus 100 consists of multiple first and second selectable shelf features 104 and 106 connected to and vertically offset from the permanent shelf 102. The first and second selectable shelf features 104 and 106 can be configured in horizontal alignment along multiple different common planes which are each parallel to the permanent shelf 102. That is, a selected number of first and second selectable features 104 and 106 can be engaged along a common plane so that the non-permanent shelf 108 is fully supported by the selectable features at an angle substantially similar to the common plane as well as the permanent shelf 102.

It should be noted that the first and second selectable shelf features 104 and 106 are configured about the outer edge of the frame assembly 101 in vertical alignment. In addition, the first selectable shelf features 104 are oriented along a vertical plane that is offset from the center of the permanent shelf 102. In an exemplary operation of the food preparation shelving apparatus 100, each non-permanent shelf 108 is tilted to a non-normal angle while the first selectable shelf features 104 corresponding to a particular horizontal plane are engaged. Subsequently, the non-permanent shelf 108 is tilted to a normal angle as the second selectable shelf feature 106 is engaged so that foodstuffs can be supported by the non-permanent shelf 108 at a substantially horizontal angle.

FIG. 2 also displays an exemplary leg configuration where a portion of the leg supports the permanent shelf 102 with a non-normal angle. Such configuration can aid in the fabrication of the frame assembly 101 by forming the leg 116 out of the selectable shelf features support column. It should be noted that while any number of legs can be configured with a non-normal support portion, such portion is not required and can be used in conjunction with orthogonal legs 114 in various orientations.

Figure 3:
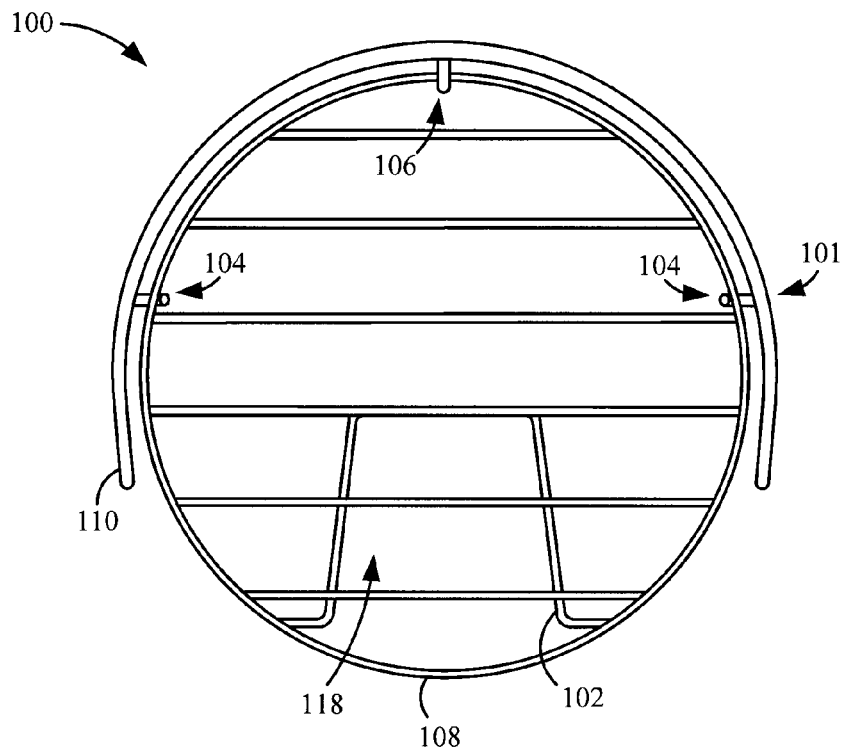
FIG. 3 shows a top elevation view of the shelving system of FIG. 1.

In FIG. 3, an elevational top view of the food preparation shelving apparatus 100 is displayed in accordance with various embodiments of the present invention. As shown, the permanent shelf 102 can be configured to include a flavor infusion region 118. In some embodiments, the flavor infusion region 118 forms an aperture in the permanent shelf 102. However, the shape and orientation of the flavor infusion region 118 are not limited and can be modified, as desired, to maximize the configurability of the frame assembly 101.

In addition, a number of non-permanent shelves 108 are secured in different common planes by the first and second selectable features 104 and 106 as well as in horizontal alignment with the permanent shelf 102. As shown, the permanent and non-permanent shelves 102 and 108 can have a substantially circular shape, but such design is not required or limiting as the shelves can be any symmetrical or asymmetrical shape while not deterring from the spirit of the present invention. However, the use of a symmetric shape for the shelves can allow for inverted engagement of the selectable shelf features 104 and 106. For example, each non-permanent shelf 108 could be secured in a common plane that is parallel to the permanent shelf 102 either from an original orientation or in an orientation upside-down in relation to the original orientation.

Figure 4:
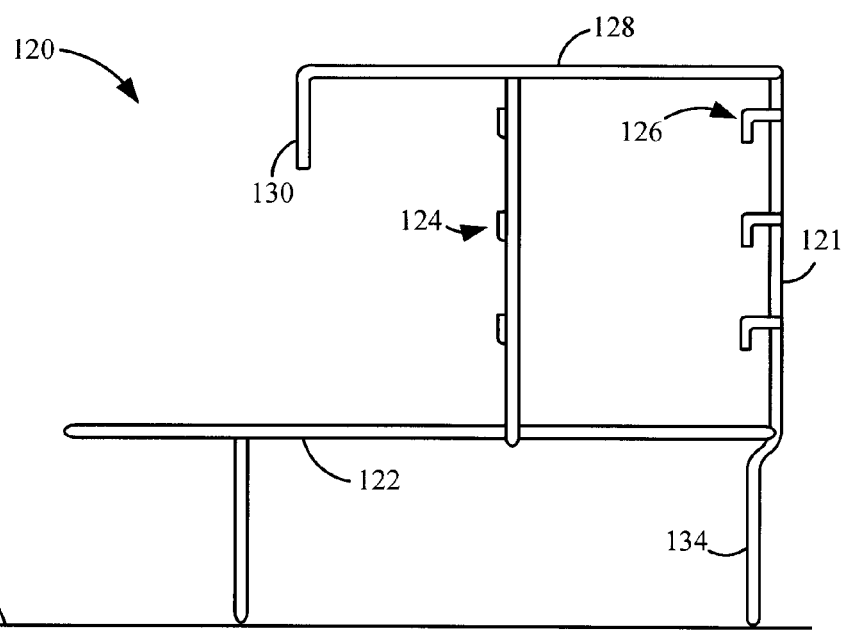
FIG. 4 generally illustrates a side elevation view of an exemplary shelving system constructed and operated in accordance with various embodiments of the present invention.

While FIGS. 1-3 have displayed the food preparation shelving apparatus 100 with a plurality of non-permanent shelves 108 secured to various first and second selectable shelf features 104 and 106, the food preparation shelving apparatus 100 can be utilized in various other configurations. In fact, FIG. 4 generally illustrates a side elevational view of a food preparation shelving apparatus 120 without any non-permanent shelves. In such an embodiment, a frame assembly 121 is secured to a permanent shelf 122 which is attached to a number of first selectable shelf features 124 and second selectable shelf features 126. The frame assembly 121 can also consist of a rail 128 that is configured to have one, or more, turn-down regions 130 that translate the rail 128 from a common plane parallel to the permanent shelf 122 to a plane substantially perpendicular with the common plane and permanent shelf 102.

Further, the first selectable shelf features 124 are configured as upward facing support components characterized by a substantially horizontal portion coupled to a projection portion extending away from the permanent shelf 122. Conversely, the second selectable shelf features 126 are configured as downward facing support components due to the presence of a substantially horizontal portion coupled to a projection portion extending towards the permanent shelf 122. As with the food preparation shelving apparatus 100 of FIGS. 1-3, the food preparation shelving apparatus 120 vertically aligns the first selectable shelf features 124 along a first column and the second selectable shelf features 126 along a second column.

Various embodiments consist of a selected number of first selectable shelf features 124 being horizontally aligned with a selected number of second selectable shelf features 126 in order to provide a potential securement position of a non-permanent shelf (such as 108 of FIGS. 1-3) that is in a common plane vertically offset and parallel to the permanent shelf 122. The frame assembly 121 can also be constructed to elevate the permanent shelf 122 above a reference plane 132 through the attachment of legs 134 between the permanent shelf 122 and the reference plane 132. However, the position and configuration of the legs 134 are not limited as either an orthogonal or non-orthogonal portion of the leg 134, can be used to support the permanent shelf 122 above the reference plane 132.

Figure 5:
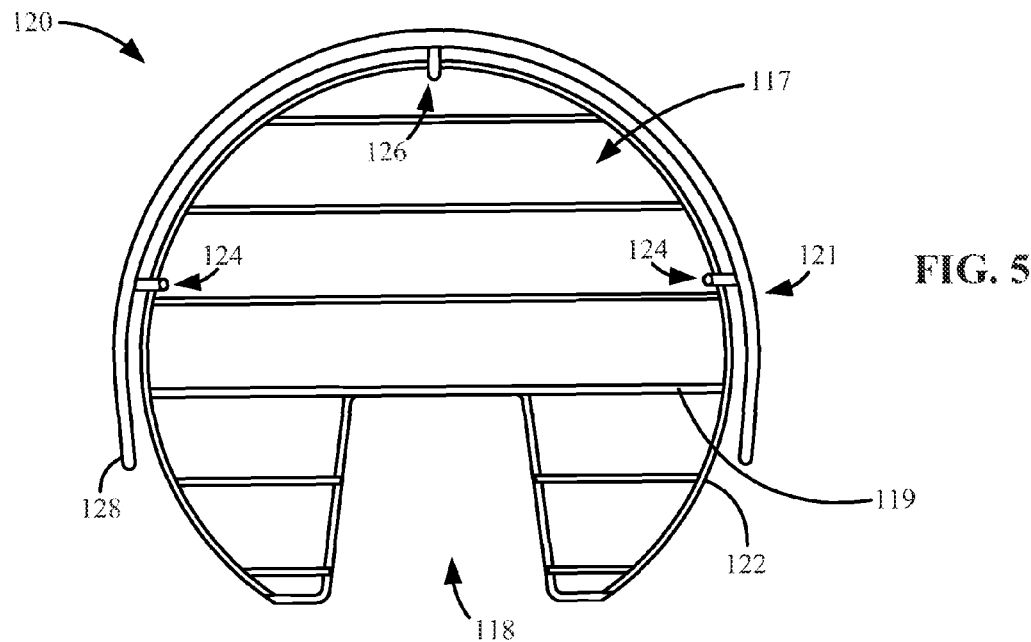
FIG. 5 provides a top elevation view of the shelving system of FIG. 4.

FIG. 5 provides a top elevational view of the food preparation shelving apparatus 120 as constructed in accordance with various embodiments of the present invention. The flavor infusion region 118 is shown as an aperture accessible from one side of the permanent shelf 122. The balance of the permanent shelf 122 provides a food stuff support region 117. The food stuff support region 117 is formed by a plurality of unidirectional, adjacent, spaced apart support 119, wherein a space between adjacent support members 119 is void of structure along an entire length of the spaced apart support members 119. Additionally, the first selectable shelf features 124 are configured to be along a cord line which has a maximum length less than the diameter of the permanent shelf 122. That is, the first selectable shelf features 124 are horizontally aligned along a plane that is offset from the center of the permanent shelf 122. It can also be recognized that the first and second selectable features 124 and 126 are positioned at different locations along the outer extent of the frame assembly 121 and the permanent shelf 122, but extending towards a point interior to the circumference of the permanent shelf 122.

Figure 6:
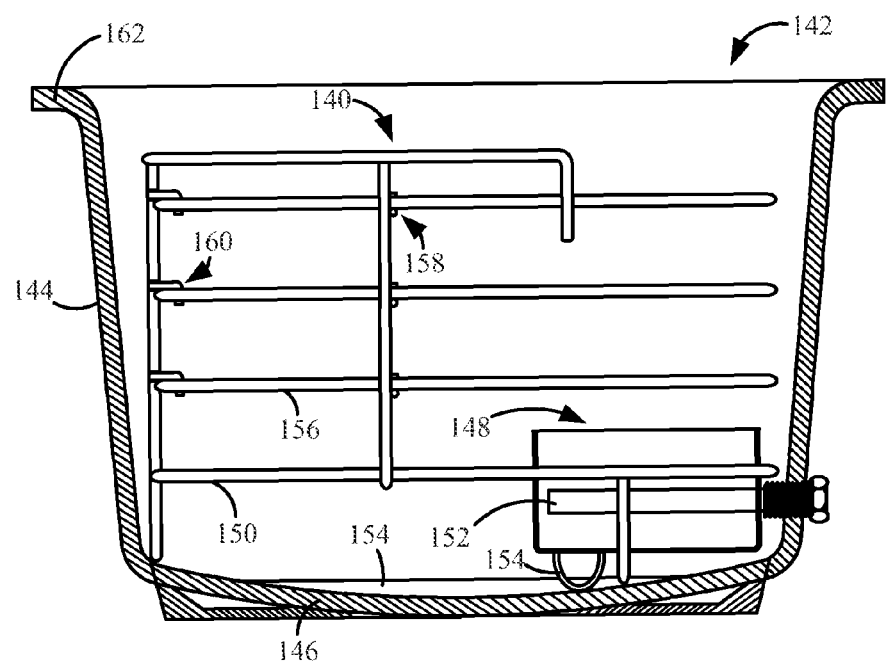
FIG. 6 illustrates an exemplary environment in which a shelving system can be used in accordance with various embodiments of the present invention.

In FIG. 6, an operational view of a food preparation shelving apparatus 140 is generally displayed in an exemplary environment. The food preparation shelving apparatus 140 is positioned in a food preparation chamber 142 having a cylindrical side wall 144, but remains self-supporting as none of the side walls 144 of the chamber 142 are contacted by any portion of the food preparation shelving apparatus 140. That is, the food preparation shelving apparatus 140 can support foodstuffs (not shown) in the food preparation chamber 142 without being supported by anything but the base 146 of the chamber 142.

Such self-supporting characteristics further correspond to the installation of a flavor infusion component 148 in the flavor infusion region of the permanent shelf 150. As such, the flavor infusion component 148 is positioned internal to the circumference of the permanent shelf 150 so that the permanent shelf 150 partially surrounds the component without contactingly engaging the flavor infusion component 148. It should be noted that the design, position, and orientation of the flavor infusion component 148 is not limited and can be modified from the depiction in FIG. 6 as desired.

Further in some embodiments, the flavor infusion component 148 includes a flavor infusion element 152 that provides a predetermined flavor from a flavor enhancement substance that can be infused into foodstuffs. While the orientation of the flavor infusion component 148 is not limited, an energy transfer member 155 can be used in conjunction with the base 146 of the food preparation chamber 142 to level the flavor infusion component 148. The operation of the flavor infusion component 148 can further be facilitated by the presence of a selected amount of flavor infusion liquid 154 along the base 146. In an exemplary embodiment, water has been found to suffice as the flavor infusion liquid 154.

While multiple non-permanent shelves 156 are shown supported parallel, but vertically offset to the permanent shelf 150 by first and second selectable shelf features 158 and 160, the number and position of the shelves are not limited. For example, no non-permanent shelf 156 could be present and the permanent shelf 150 could be the only location available to support foodstuffs. As shown, the food preparation shelving apparatus 140 is positioned in the food preparation chamber 142 below the lip 162 so that a lid (not shown) can be positioned over the chamber 142 to elevate pressure and temperature in the chamber 142.

Figure 7:
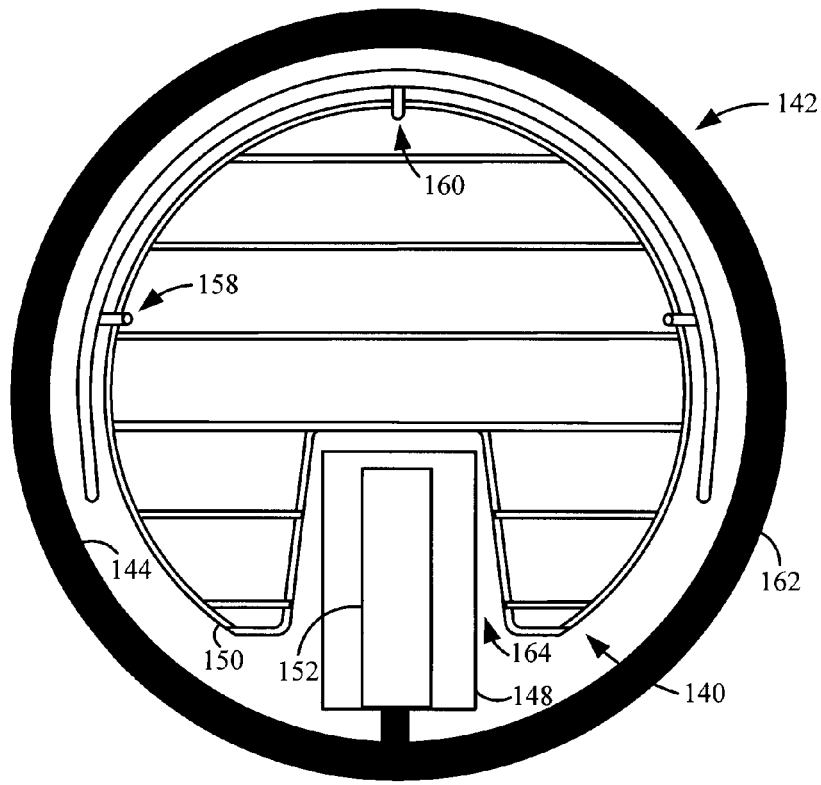
FIG. 7 shows a top elevation view of the exemplary environment displayed in FIG. 6.

Moreover, the position and operation of the food preparation shelving apparatus 140 in relation to the food preparation chamber 142 is displayed in the elevational top view of FIG. 7. The relationship between the flavor infusion region 164 and the flavor infusion component 148 can be readily discerned as partially surrounding, but not contactingly engaging one another. Likewise, the food preparation shelving apparatus 140 does not contactingly engage any portion of the cylindrical side wall 144. In various embodiments, the flavor infusion region 164 can be configured with a variety of different shapes and orientations to partially surround the flavor infusion component 148, but it should be noted that no one configuration is required or limiting.

Figure 8:
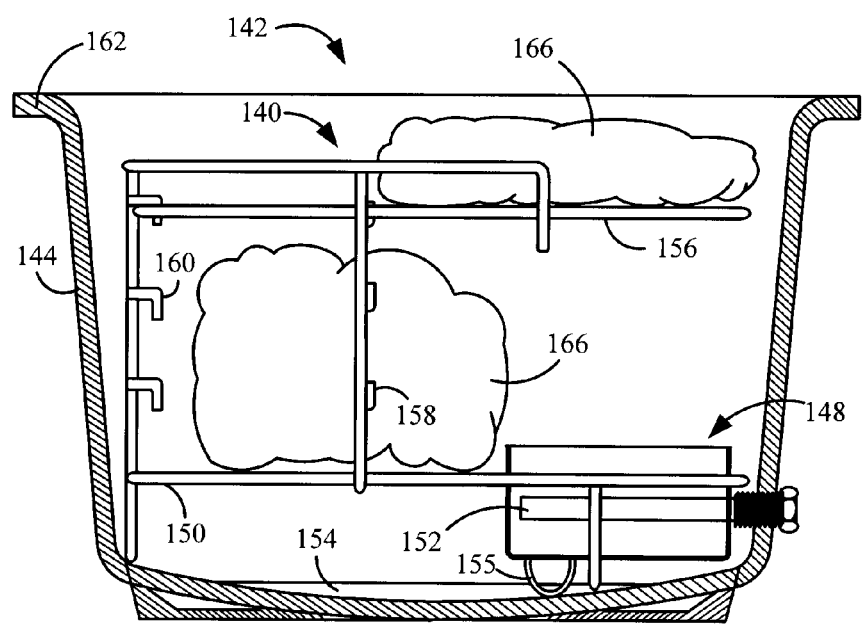
FIG. 8 provides an exemplary operation of the shelving system in the environment of FIG. 6 in accordance with various embodiments of the present invention.

Another exemplary operation of the food preparation shelving apparatus 140 is generally illustrated from a side elevational view in FIG. 8. As shown, a single non-permanent shelf 156 is secured to a selected number of first and second selectable shelf features 158 and 160 in order to support the shelf 156 substantially along a common plane that is vertically offset and parallel to the shelf 156. An advantage of supporting the non-permanent shelf 156 with several selectable shelf features that are inverted in relation to one another is the ability to support foodstuffs 166 without concern for inadvertent movement of the food preparation shelving apparatus 140.

Another advantage of the food preparation shelving apparatus 140 is the ability to selectively position any desired number of non-permanent shelves 156 to accommodate different sized foodstuffs 166. Hence, FIG. 8 displays one non-permanent shelf 156 being present and foodstuffs 166 on both the permanent and non-permanent shelves 150 and 156, simultaneously. Furthermore, the self-supporting design of the food preparation shelving apparatus 140 allows for food to be supported by the different shelve while not contacting the side wall 144 or the flavor infusion component 148 of the food preparation chamber 142.

In an exemplary operation of the environment displayed in FIG. 8, the food preparation chamber 142 would be sealed while the temperature and pressure of the chamber 142 is increased. As a result, flavor from the flavor enhancement substance in combination with the flavor infusion liquid 154 combines in a semi-liquid, semi-gaseous form that easily penetrates completely through the foodstuffs 166. Alternatively, the amount of pressure and temperature present in the food preparation chamber 142 can be controlled and monitored for a predetermined amount of time to infuse a desired amount of flavor into the foodstuffs 166.

Figure 9:
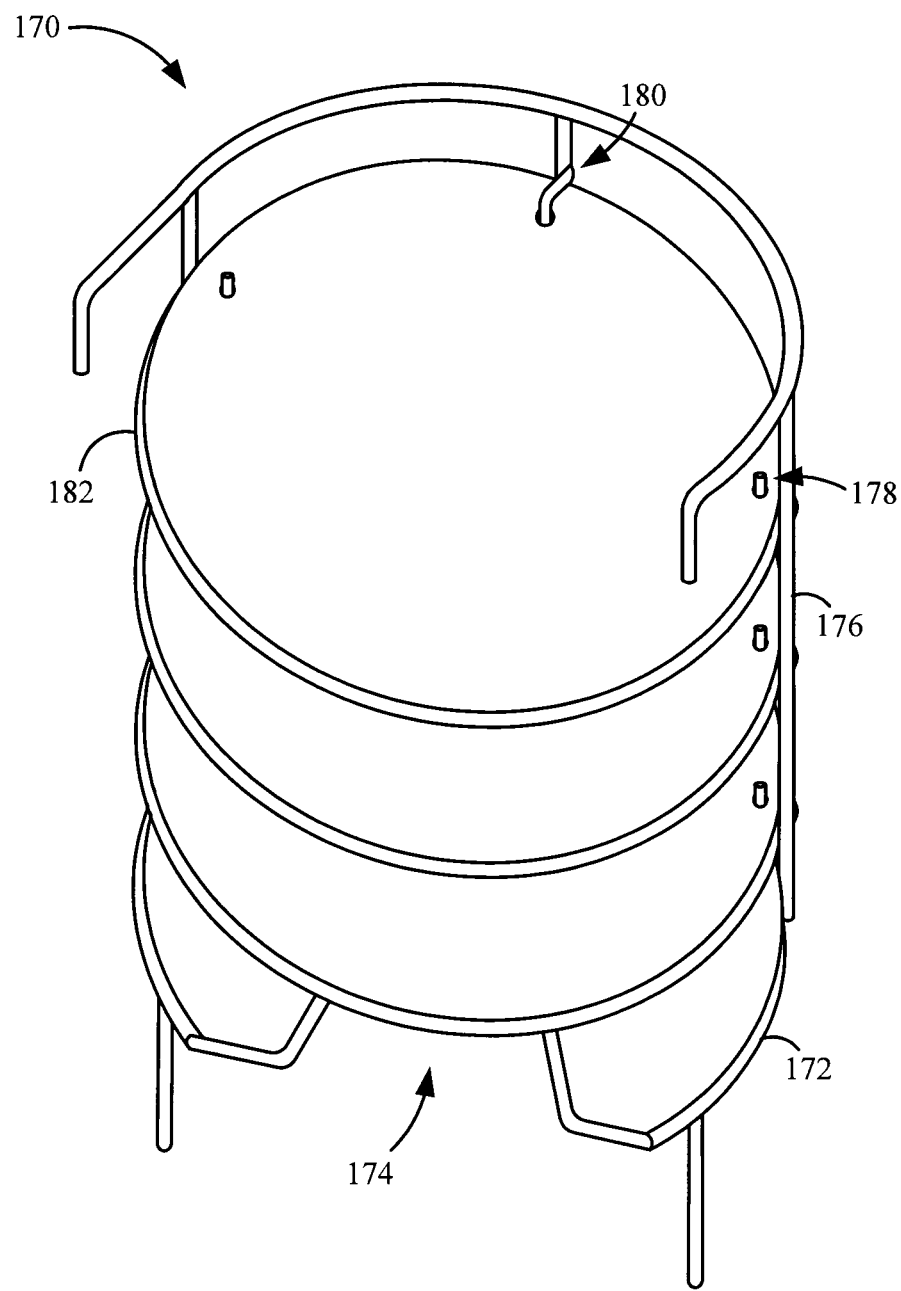
FIG. 9 illustrates a top perspective view of an alternate embodiment of the inventive shelving system showing solid shelves.

Turning now to FIG. 9 which provides an isometric view of a food preparation apparatus 170 constructed and operated in accordance with various embodiments of the present invention. A permanent shelf 172 that includes a flavor infusion region 174 is secured to a frame assembly 176 as well as a plurality of first and second selectable shelf features 178 and 180, each vertically offset and parallel to the permanent shelf 172. A number of non-permanent shelves 182 are supported by a select number of selectable shelf features 178 and 180. However, the non-permanent shelf 182 is constructed as a solid piece. While not limiting or required, the non-permanent shelf 182 can be configured so that a solid surface supports any foodstuffs.

It can be appreciated that a solid surface is not limited to a single piece of material, but rather indicates that foodstuffs can rest on a uniform surface as opposed to a grate style surface in which the foodstuff spans one or more cross-bars. However, the design and configuration of the non-permanent shelf 182 can further be modified, as desired, without deterring from the spirit of the present invention. For example, perforated holes and/or a non-stick coating can be included on all, or a portion, of the non-permanent shelf 182. In addition, the non-permanent shelve 182 is not required to have identical features as some may have a grate style surface while others have a coating or a solid surface. Likewise, the surface of the permanent shelf is not limited and can be dissimilar to the surfaces of the non-permanent shelves 182.

Figure 10:
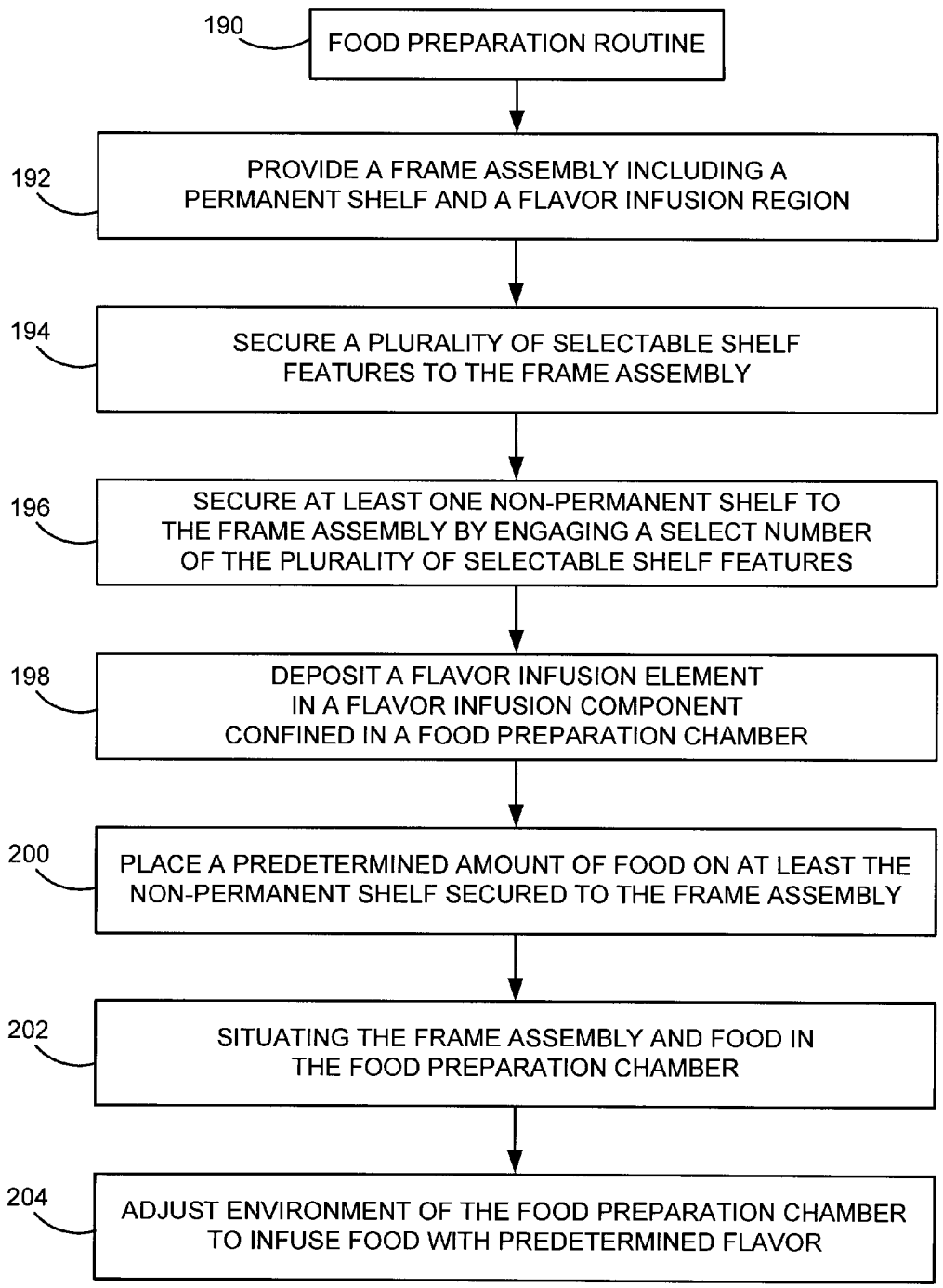
FIG. 10 displays a flowchart of an exemplary FOOD PREPARATION PROCESS carried out in accordance with various embodiments of the present invention.

An exemplary use of the food preparation apparatus is generally provided in the food preparation routine 190 of FIG. 10. In step 192, a frame assembly is provided that is secured to a permanent shelf that has a flavor infusion region.

The frame assembly can also include a plurality of selectable shelf features that are secured to the frame assembly in step 194 and vertically aligned and offset from the permanent shelf. A non-permanent shelf engages and is supported by a select number of selectable shelf features in step 196 so that the non-permanent shelf is supported substantially in a common plane that is vertically offset and parallel to the permanent shelf.

A flavor enhancement element is then deposited in a flavor infusion component, in step 198, that is confined in a food preparation chamber. It can be appreciated that the flavor enhancement element can be a wide variety of substances of various forms. Step 200 places a predetermined amount of food on at least the non-permanent shelf secured to the frame by the select number of selectable shelf features. The frame assembly and food are subsequently situated in the food preparation chamber in step 202 while avoiding contact with the cylindrical wall of the food preparation chamber or the flavor infusion chamber.

Finally in step 204, the environment in the food preparation chamber is adjusted to infuse the food with the predetermined flavor from the flavor enhancement element. It should be noted that the various steps of the food preparation routine 190 can be readily changed or omitted, as necessary. For example, the food can be placed on the non-permanent shelf after the frame assembly is situated in the food preparation chamber. Further, the food preparation routine 190 is merely exemplary in nature and does not limit the potential scope of use for the food preparation apparatus.

To enhance an understanding of the various embodiments, but not by way of imposing limitations on the present invention, an overview of an exemplary embodiment of a use for the present invention is disclosed with reference to FIGS. 6-8. This particular use embodiment is for illustrative purposes only, does not restrict use, impose or inherently impose limitations on use of the present invention, nor does it encompass all available preparation cycle variants. It is noted that the present invention may be used in preparing preconditioned food product. For the illustrative examples given above, operation of the food preparation apparatus will be described for use in those situations in which flavor enhancement of the food product is desired.

For the following illustrative disclosure examples (one of a plurality of uses for the present invention), wood chips or other flavoring substances are introduced into the food preparation chamber for use in impregnating the food product with an enhanced flavor, in particular a smoke flavor. It is noted that in addition to a broad array of woods from which wood chips may be selected as flavor enhancement substances, alternate flavor enhancement substances such as herbs, spices, extracts, wines or spirits (to name a few) may be selected by the user for introduction into the food preparation chamber.

A user may elect to operate the food preparation apparatus in the absence of pressure or steam. The food product can be exposed to smoke generated by the wood chips contacting the energized flavor enhancement element. The food preparation chamber promotes impregnation of a smoke flavor into the food product, which may be cooked at a later time, either by the food preparation chamber or by alternate means. For example, steaks or fish or other food may be cold smoked and then charbroiled on a grill. Alternatively, cheeses, nuts and other foods may be cold smoked for consumption.

The user may alternatively select impregnating the food product with a smoke flavor using a sequential combination pressure and heat. Such pressure cooking can involve putting the food product in a sealed container with a small amount of water and applying heat. This confines the food product in a sealed pressure vessel that prevents the juices and flavor of the food from escaping into the environment.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A food preparation apparatus comprising:
   a frame assembly;
   a permanent shelf secured to said frame assembly;
   a plurality of selectable shelf features vertically offset from the permanent shelf and attached to the frame assembly; and
   a first non-permanent shelf vertically offset from the permanent shelf and supported by a select number of the plurality of selectable shelf features, wherein the permanent shelf, but less than all the shelves attached to the frame assembly, provides a food stuff support region and a flavor infusion region, the flavor infusion region adjacent to and confining a flavor infusion component on at least two but no more than three sides, the infusion region in non-contacting adjacency with the flavor infusion component, the food stuff support region comprising a plurality of unidirectional, adjacent, spaced apart support members, in which space between each spaced apart support members is void of structure along an entire length of the spaced apart support members.

2. The apparatus of claim 1, in which the select number of the plurality of selectable shelf features is greater than one and forms a group of selectable shelf features lying in a common plane, wherein the common plane lies substantially parallel to the permanent shelf.

3. The apparatus of claim 1, wherein the flavor infusion region forms an aperture in the permanent shelf.

4. The apparatus of claim 3, further comprising:
   a food preparation chamber supporting the frame assembly; and
   a flavor infusion element confined within said flavor infusion component, which is within said flavor infusion region, infusion region, said flavor infusion region is within said food preparation chamber.

5. The apparatus of claim 1, wherein the permanent shelf is elevated above a reference surface by a plurality of leg members, and the non-permanent shelf presents a continuous solid support surface.

6. The apparatus of claim 1, further comprising:
   a food preparation chamber formed from a cylindrical side wall supported by a base; and
   a second non-permanent shelf offset from said permanent shelf, non-contactingly adjacent said first non-permanent shelf, and supported by a select number of the plurality of selectable shelf features forming a group of selectable shelf features lying in a common plane, wherein the common plane lies substantially parallel to the permanent shelf the frame assembly, and in which each said permanent, first and second shelves are configured to simultaneously support foodstuffs within said food preparation chamber while remaining in non-contacting adjacency with said cylindrical side wall.

7. The apparatus of claim 1, wherein the selectable shelf features are formed from a plurality of upward and downward facing support components that are disposed vertically offset from the outer edge of the permanent shelf and secured to the frame assembly in non-contacting adjacency one to the other.

8. The apparatus of claim 7, in which said permanent shelf forms a circular structure, and wherein at least two of the upward facing support components are positioned at the extents of a cord line in which the cord line has a maximum length less than a diameter of said permanent shelf.

9. The apparatus of claim 1, further comprising a non-circumferential rail supported by the permanent shelf, forming a portion of said frame assembly, and providing a structure for the attachment of the plurality of selectable shelf features.

10. The apparatus of claim 1, wherein the non-permanent shelf is configured to be tilted in relation to the permanent shelf to attain support by the multiple selectable shelf features, and the permanent shelf presents a continuous solid support surface.

11. The apparatus of claim 1, wherein the non-permanent shelf is supported by a first selectable shelf feature and a plurality of second selectable shelf features, wherein the plurality of second selectable shelf features present an inverted orientation relative to an orientation of the first selectable shelf feature.

12. The apparatus of claim 1, wherein the non-permanent shelf is configured for support by the select number of the plurality of selectable shelf features in both a first and second orientation relative to said permanent shelf, wherein the second orientation is an inverse of the first orientation.

\* \* \* \* \*